United States Patent
Schmidt et al.

(10) Patent No.: US 10,362,361 B2
(45) Date of Patent: Jul. 23, 2019

(54) SYSTEMS AND METHODS FOR DYNAMIC INCLUSION AND EXCLUSION OF A VIDEO FROM A MEDIA GUIDANCE INTERFACE

(71) Applicant: Rovi Guides, Inc., San Carlos, CA (US)

(72) Inventors: Margret Schmidt, Redwood City, CA (US); Alexander William Liston, Menlo Park, CA (US)

(73) Assignee: ROVI GUIDES, INC., San Jose, CA (US)

(*) Notice: Subject to any disclaimer, the term of this patent is extended or adjusted under 35 U.S.C. 154(b) by 0 days.

(21) Appl. No.: 15/628,152

(22) Filed: Jun. 20, 2017

(65) Prior Publication Data
US 2018/0367860 A1    Dec. 20, 2018

(51) Int. Cl.
| | | |
|---|---|---|
| *H04N 21/258* | (2011.01) | |
| *H04N 21/431* | (2011.01) | |
| *H04N 21/442* | (2011.01) | |
| *H04N 21/454* | (2011.01) | |
| *H04N 21/466* | (2011.01) | |
| *H04N 21/482* | (2011.01) | |
| *H04N 21/25* | (2011.01) | |
| *H04N 21/45* | (2011.01) | |

(52) U.S. Cl.
CPC ....... *H04N 21/4821* (2013.01); *H04N 21/251* (2013.01); *H04N 21/25891* (2013.01); *H04N 21/4316* (2013.01); *H04N 21/44218* (2013.01); *H04N 21/44222* (2013.01); *H04N 21/4532* (2013.01); *H04N 21/4542* (2013.01); *H04N 21/4667* (2013.01)

(58) Field of Classification Search
CPC ............ H04N 21/4821; H04N 21/431; H04N 21/4316; H04N 21/44222; H04N 21/4532; H04N 21/4667; H04N 21/251; H04N 21/25891; H04N 21/44218; H04N 21/4542
See application file for complete search history.

(56) References Cited

U.S. PATENT DOCUMENTS

| | | | |
|---|---|---|---|
| 6,239,794 B1 | 5/2001 | Yuen | |
| 6,563,515 B1 * | 5/2003 | Reynolds | ........... H04N 5/44543 348/E5.105 |
| 6,564,378 B1 | 5/2003 | Satterfield | |
| 6,978,473 B1 * | 12/2005 | Nsonwu | ............. H04N 5/44543 348/E5.105 |

(Continued)

*Primary Examiner* — James R Sheleheda
(74) *Attorney, Agent, or Firm* — Haley Guiliano LLP

(57) ABSTRACT

Systems and methods are provided herein for dynamically including or excluding a video from a media guidance interface based on indications of user interest. To this end, the systems and methods generate a video for display using user equipment and receive a command from a user to display a media guidance interface while the video is being generated for display, the media guidance interface including a plurality of video identifiers. In response to receiving the command, the systems and methods determine whether the user has interest in the video. In response to determining that the user has interest in the video, the systems and methods generate the media guidance interface for display along with the video. In response to determining that the user has no interest in the video, the systems and methods generate the media guidance interface for display without the video.

20 Claims, 7 Drawing Sheets

(56) References Cited

U.S. PATENT DOCUMENTS

| | | |
|---|---|---|
| 7,165,098 B1 | 1/2007 | Boyer |
| 7,284,202 B1* | 10/2007 | Zenith ................ G06Q 10/10 |
| | | 715/744 |
| 7,761,892 B2 | 7/2010 | Ellis |
| 7,899,915 B2* | 3/2011 | Reisman ............ G06F 16/954 |
| | | 709/228 |
| 8,046,801 B2 | 10/2011 | Ellis |
| 8,497,942 B2* | 7/2013 | Friedlander ........ H04N 21/4314 |
| | | 348/563 |
| 2002/0078453 A1* | 6/2002 | Kuo ................... H04N 5/44543 |
| | | 725/46 |
| 2002/0147976 A1* | 10/2002 | Yuen ................. H04N 5/44543 |
| | | 725/40 |
| 2002/0174430 A1 | 11/2002 | Ellis |
| 2005/0251827 A1 | 11/2005 | Ellis |
| 2010/0153885 A1 | 6/2010 | Yates |
| 2011/0107364 A1* | 5/2011 | Lajoie ................. H04L 65/1016 |
| | | 725/25 |
| 2012/0131616 A1* | 5/2012 | Kunkel .................... H04N 5/76 |
| | | 725/43 |
| 2013/0047186 A1* | 2/2013 | Strothman ........... H04N 13/004 |
| | | 725/46 |
| 2014/0123191 A1* | 5/2014 | Hahn ................. H04N 5/44543 |
| | | 725/41 |
| 2014/0282730 A1* | 9/2014 | Hieb .................... H04N 21/482 |
| | | 725/41 |
| 2015/0281783 A1* | 10/2015 | Laksono .......... H04N 21/44222 |
| | | 725/10 |
| 2017/0255975 A1* | 9/2017 | McDevitt ........... G06Q 30/0623 |
| 2017/0324624 A1* | 11/2017 | Taine ..................... H04L 41/22 |
| 2017/0366831 A1* | 12/2017 | Boyer ................. H04N 21/251 |
| 2018/0152750 A1* | 5/2018 | McMahon ......... H04N 21/4108 |

\* cited by examiner

SYSTEMS AND METHODS FOR DYNAMIC INCLUSION AND EXCLUSION OF A VIDEO FROM A MEDIA GUIDANCE INTERFACE

BACKGROUND

In typical television guidance systems, users could view programs in a number of display arrangements, such as a picture-in-picture (PiP) window and a picture-in-graphic (PiG) window. These display arrangements allow users to simultaneously view multiple television programs on the same display screen, or to view a television program within a television guidance interface. However, these display arrangements are often generated for display with no regard as to whether the users are actually watching the television programs or whether they want to watch these programs at all.

As such, when a user requests the television guidance interface to be displayed, a PiG window may appear within the television guidance interface, where a program that the user is not interested in viewing might be displayed. Worse still, the PiG window may display a program that the user is actively trying to avoid. This results in the user having to go through additional settings to turn off the PiG window. On the other hand, if PiG windows are disabled for a particular television guidance system, the user would not be able to view PiG windows even if she wanted to, unless she goes through the settings and turns the PiG window back on. This introduces repeated settings and inefficiencies into the system because more inputs from the user need to be processed.

SUMMARY

Accordingly, systems and methods are disclosed herein for dynamically including a video in a media guidance interface or excluding the video from the media guidance interface, based on indications of user interest. The indications of user interest can be either an explicit manifestation (e.g., when the user actively selected an identifier of the video to be displayed), or an implicit indication (e.g., when the user adjusts the volume or engages in a discussion about the video while the video is being displayed). By dynamically including or excluding the video from the media guidance interface, users could be presented with videos that they were interested in viewing and avoid videos that they were not interested in (at least those that the users were not interested in viewing during a particular period of time). For example, a user could avoid being exposed to spoilers if the media guidance application excludes a video that is currently being recorded from the guidance interface when the user first turns on the user equipment.

To this end and others, in some embodiments, a media guidance application generates a video for display using user equipment. For example, the media guidance application running on a set-top box may generate a television program for display on a television. In some embodiments, the media guidance application may receive a command from a user to display a media guidance interface while the video is being generated for display. The media guidance interface may include a plurality of video identifiers. For example, the media guidance application may receive an input from a user by way of a remote control (e.g., by pressing the GUIDE button) to display a media guidance interface while the television program is being generated for display by the set-top box. The media guidance interface, in this example, may include a number of television program listings, each identifying a television program.

In some embodiments, the media guidance application may determine whether the user has interest in the video in response to receiving the command. The media guidance application may do so by determining whether the video was caused to be displayed based on a user selection of an identifier of the video. For example, the media guidance application may determine that the television program being displayed on the television was caused to be displayed by the user's explicit selection of a program listing corresponding to the television program. In some embodiments, the explicit selection of a video identifier, such as a program listing, shows that the user has an interest in the video.

In some embodiments, the media guidance application may, in response to determining that the video was caused to be displayed based on the user selection of the identifier, generate for display the media guidance interface that simultaneously includes both the video and the plurality of video identifiers, with the user equipment. For example, the media guidance application may, upon determining that the user explicitly selected the program listing (hence showing an interest in the corresponding television program), generate for display the media guidance interface including both the television program and a list of other program listings. The television program may be generated by the set-top box for display in a PiG window of the media guidance interface on the television.

In some embodiments, the media guidance application may, in response to determining that the video was not caused to be displayed based on the user selection of the identifier, determine whether the user previously indicated interest in the video. For example, the media guidance application may determine that the user did not cause the television program to be displayed by selecting the program listing. In response, the media guidance application may determine whether the user has previously indicated interest in the television program (such as adjusting the volume while viewing the television program). In some embodiments, user indications of interest also include one or more playback instructions, such as pause, fast-forward, rewind, replay, advance, or slow-motion. For example, the media guidance application may determine whether the user has previously indicated interest in the television program by rewinding the program or playing the program in slow-motion.

In some embodiments, the media guidance application may, in response to determining that the user previously indicated interest in the video, determine an amount of time that has lapsed since the user previously indicated interest in the video, and compare the amount of time that has lapsed with a predetermined threshold. For example, the media guidance application may determine an amount of time between the time when the user adjusted the volume and a present time, and compare the amount of time against a predetermined threshold. The threshold may be set by the user in advance to specify for how long an implied indication of interest stays effective.

In some embodiments, the media guidance application may generate for display, with the user equipment, the media guidance interface without the video if the amount of time exceeds the predetermined threshold. For example, the media guidance application may determine that the amount of time exceeds the predetermined threshold, i.e., the user's indication of interest in the television program happened too long ago and therefore is no longer representative of the user's current level of interest. In this situation, the media guidance application may simply generate the media guidance interface alone, without the television program in the PiG window or a similar display arrangement.

In some embodiments, the media guidance application may generate for display, with the user equipment, the media guidance interface that simultaneously includes both the video and the plurality of video identifiers if the amount of time does not exceed the predetermined threshold. For example, the media guidance application may generate the media guidance interface along with the television program in the PiG window if the amount of time does not exceed the predetermined threshold, i.e., the user's implied indication of interest happened recently enough to still be indicative of the user's current level of interest in the television program.

In some embodiments, the media guidance application may generate for display, with the user equipment, the media guidance interface without the video in response to determining that the user did not previously indicate interest in the video. For example, the media guidance application may determine that the user not only did not select the television program explicitly for display, but also did not show any indications of interest while the television program was being played. This may occur, for example, if the television program happens to be playing when the set-top box was first turned on. In such situations, the media guidance application may generate the media guidance interface for display without the television program at all because the user has shown no interest in viewing it at all.

In some embodiments, the media guidance application may extract metadata associated with the video to determine whether the video includes spoilers when the command is received to generate for display the media guidance interface. For example, the media guidance application may extract metadata from the information received by the set-top box from a remote server to determine whether the television program corresponding to the metadata was showing spoilers when the user pressed the GUIDE button on the remote. In other words, the media guidance application may determine whether the television program happens to be playing any important plot point (or beat) when the user's command to display the media guidance interface is received. In some embodiments, the media guidance application may determine whether the video includes spoilers for a sporting event by determining whether a score of the sporting event or a sports excitement rating for the sporting event is being shown or about to be shown.

In some embodiments, the media guidance application may, in response to determining that the video includes spoilers when the command is received, generate for display, with the user equipment, the media guidance interface without the video regardless of whether the user previously indicated interest in the video, so that spoilers are not presented to the user. For example, if the media guidance application determines that the television program is playing spoilers (beats) when the GUIDE button is pressed, it may generate the media guidance interface without the television program in a PiG window because it is likely that the user gave the command to show the media guidance interface because she wanted to avoid seeing the spoiler—so continuing to show the spoiler in a PiG window would be contrary to what the user had wanted to accomplish by pressing the GUIDE button.

In some embodiments, the media guidance application may generate the video for display with the user equipment by powering on a display device of the user equipment while the video is being recorded. For example, the media guidance application may generate the television program for display because the user had previously scheduled the television program to be recorded at the present time. In some embodiments, the media guidance application may, in response to determining that the video was not caused to be displayed based on the user selection of the identifier, generate for display the media guidance interface without the video regardless of whether the user previously indicated interest in the video. For example, the media guidance application may, upon determining that the television program was previously scheduled to be recorded at the present time, and not explicitly caused to be displayed by the user, simply display the media guidance interface without the television program. In this manner, the media guidance application avoids showing any spoilers in the television program being recorded, as a safety measure, even if the user had previously indicated interest in the television program. If the user indeed wishes to continue viewing the television program in the media guidance interface, the viewer may indicate this desire to the media guidance application, for example, by pressing a dedicated PiG button to toggle "on" the PiG window. However, by default, the media guidance application refrains from displaying any television program that is currently being recorded, at least when it was previously scheduled to be recorded at the present time.

In some embodiments, the media guidance application may determine the amount of time that has lapsed since the user previously indicated interest by identifying a point in time when the user most recently adjusted volume or brightness of the video, and calculating the amount of time based on a difference between the point in time and a current time. For example, the media guidance application may identify a point in time when the user last adjusted the volume or the screen brightness, or issued a playback instruction on a remote control for the television program. In some embodiments, the user's concerted interactions with the television program, such as adjusting the volume or the screen brightness, are implicit indications that the user is interested in the television program. Thereafter, the media guidance application may calculate the amount of time lapsed as the difference between the point in time (when the user most recently made the adjustment) and the current time.

In some embodiments, the media guidance application may receive a further command from the user that indicates the user's interest in the video while the media guidance interface is generated for display without the video. For example, while the media guidance interface is generated with only the program listings and without the television program, the media guidance application may receive a further command to indicate that the user is actually interested in the television program. This command may be in the form of an input via the remote control, a voice command, or any other suitable form. In some embodiments, the media guidance application may, in response to receiving the further command, generate for display the media guidance interface that simultaneously includes both the video and the plurality of video identifiers with the user equipment. For example, the media guidance application running on the set-top box may now include the television program in the media guidance interface when the further command is received.

In some embodiments, the media guidance application may determine that the user has indicated a desire to stop the video while the media guidance interface is generated for display that simultaneously includes both the video and the plurality of video identifiers. For example, the media guidance application, while generating the media guidance interface for display together with the television program in a PiG window, may determine that the user has indicated a desire to stop playing the television program. The user's desire to stop playing the television program may be determined by monitoring the user's interest in the television program or by an explicit user instruction to stop playing the video. For instance, the media guidance application may determine, by way of a connected smart watch that the user is wearing, that the user has fallen asleep, hence the television program should be paused and saved for a later time; the media guidance application may also determine that the user has pressed a button on a remote control that explicitly instructs the media guidance application to stop playing the television program.

In some embodiments, the media guidance application may, in response to determining that the user indicated the desire to stop the video, exclude the video from the media guidance interface. The determination that the user has indicated the desire to stop the video can be based on explicit or implicit user actions. For example, the media guidance application may exclude the television program from the media guidance interface when it determines that the user has indicated the desire to stop playing the television program (e.g., when the user has fallen asleep or issued an explicit instruction to stop, as discussed above).

In some embodiments, the media guidance application may determine whether the user previously indicated interest in the video by monitoring audio communications surrounding the user equipment using an audio input device; performing speech recognition on the audio communications to extract keywords of the audio communications; and determining whether the keywords relate to the video. For example, the media guidance application may instruct an audio input device near the set-top box to monitor the audio communications in the vicinity. By performing speech recognition on the audio communications, the media guidance application may identify keywords in the audio communications and determine whether the keywords are related to the television program that is currently being displayed. If the keywords (hence the communications in the vicinity) are related to the television program, the media guidance application may determine that the user has indicated interest in the television program. Conversely, if the keywords are not related to the television program, the media guidance application may determine that the user is distracted from the television program and therefore demonstrates little interest in it.

In some embodiments, the media guidance application may generate the media guidance interface for display without the video in response to determining that the user equipment was powered on within less than a threshold time period. For example, the media guidance application may determine that the set-top box was powered on not too long ago—within a threshold time period—such that no video shall be included with the media guidance interface if the user requested to display the media guidance interface. This is because a user who quickly presses the GUIDE button to display the media guidance interface shortly upon turning on the set-top box typically has little or no interest in what is being played on the television at the time. The user's level of interest in the default program is likely very low if the user presses the GUIDE button soon after turning on the set-top box. Accordingly, the media guidance application will not display the (default) television program to avoid distracting the user. On the other hand, if the user, upon turning on the set-top box, has watched the (default) television program for a period of time longer than the threshold time period, the media guidance application may determine that the user has demonstrated sufficient interest in the television program, and may continue to include the television program in the media guidance interface, so that the television program is displayed simultaneously with the program listings.

In some embodiments, the media guidance application may determine, with a proximity sensor, that the user has left a viewing area of the user equipment prior to the video being generated for display. For example, the media guidance application may determine, by way of a proximity sensor, that, prior to the television program beginning to play on the set-top box, the user left the viewing area of the television. In some embodiments, the media guidance application may determine, with the proximity sensor, that the user has returned to the viewing area at a first point in time while the video is being generated for display. For example, the media guidance application may determine that the user has returned to the viewing area at a first point in time, after the television program has begun to play. In other words, the television program was not playing when the user left the vicinity, but had begun playing prior to the point in time that the user returned.

In some embodiments, the media guidance application may receive, with the user equipment at a second point in time, the command from the user to generate the media guidance interface for display. For example, the media guidance application may determine that the user pressed the GUIDE button at a second point in time, in order for the set-top box to generate the media guidance interface, after the user has returned. In some embodiments, the media guidance application may calculate a time difference between the first and second points in time, and compare the time difference against a further threshold. In some embodiments, the media guidance application may generate the media guidance interface for display without the video if the time difference does not exceed the further threshold. For example, if the time between the user's return and the user's pressing of the GUIDE button is short, the media guidance application may determine that the user has little interest in the television program being played, which had started while the user was away. This way, the media guidance application may determine whether to include or exclude a particular television program from the media guidance interface even if the television program had started while the user was away.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
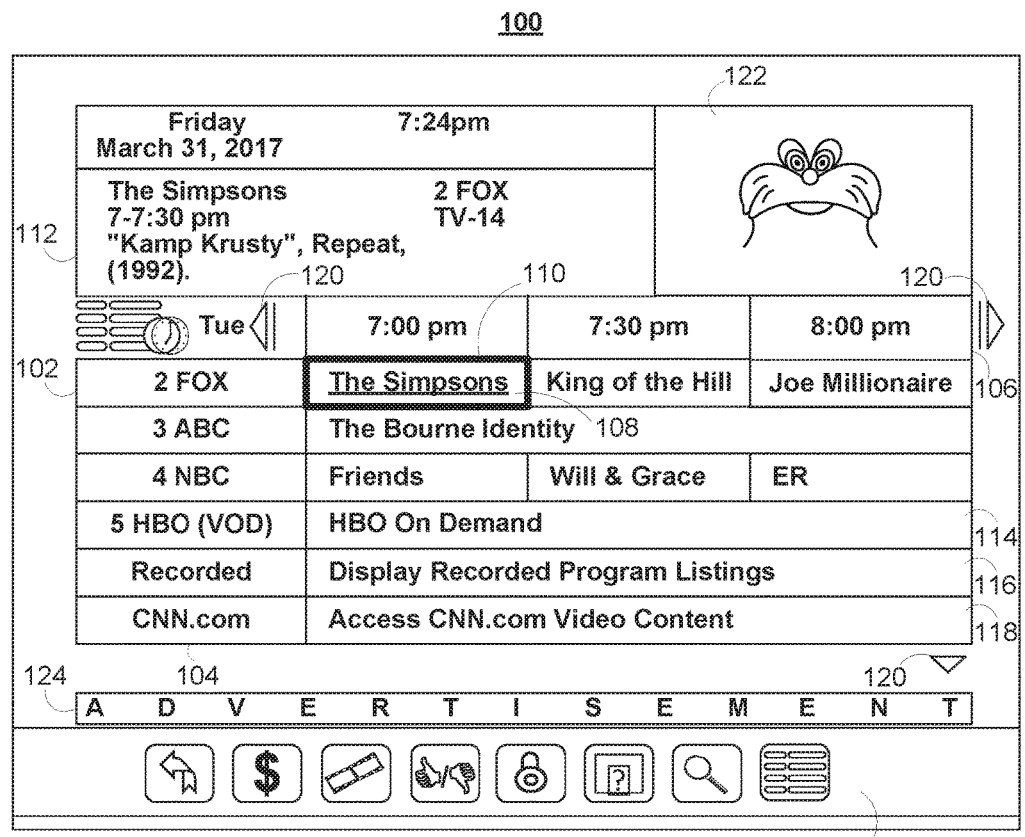
FIG. 1 shows an illustrative media guidance interface that may dynamically include or exclude a video, in accordance with some embodiments of the disclosure.

Methods and systems are disclosed herein for dynamically including or excluding a video from a media guidance interface. In particular, the described methods and systems generate a video for display using user equipment, and receive a command from a user to display a media guidance interface while the video is being generated for display. The media guidance interface includes a plurality of video identifiers. The methods and systems analyze user's explicit and implicit indications of interest in the video being displayed, to determine whether the media guidance interface to be generated as a result of the user's command should include or exclude the video. Accordingly, a "smart" media guidance interface that takes into account the user's expressed and implied desire will be provided.

As referred to herein, the phrases "video identifier," "identifier of a video," "program identifier," "media asset identifier," and "content identifier" refer to a label for a media asset. In some embodiments, the label may be a program listing, a listing for an on-demand video, a textual description for a video, a name of a media asset, a cover art, a hypertext link, a selectable option, or any other suitable label that identifies media content.

As referred to herein, the phrases "indication of user interest," "indicated interest," and "indicator of interest" refer to any implied or implicit indication that the user is interested in a particular video or media asset. An implied or implicit indication of user interest is any user action from which the user's interest in the underlying media asset can be inferred (rather than explicitly stated). For example, a user's enthusiastic discussion about a video is an implicit indication of the user's interest in the video. As another example, a user who adjusts the screen brightness or the volume of a media asset has demonstrated an implied interest in the media asset. In some embodiments, these phrases may also be used to refer to both implicit and explicit indications of user interest. For example, while the user's attentive gesture while viewing a television program is an implicit indication of interest, the user's explicit input, via a remote control, to mark the television program as favorite, is an explicit indication of interest.

As referred to herein, the phrase "display arrangement" refers to a particular layout of various functional elements on an interface of the media guidance application. For example, a display arrangement may define specific media guidance elements to be included on an interface or display screen, their relative positions, sizes, markings, fonts, selectability (and other modes of interaction), as well as other properties and functions associated with the displayed elements of the media guidance application.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application, a media application, a master media application, or a guidance application. In some embodiments, a plurality of applications is implemented on a given device.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), videos and video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance. In some embodiments, guidance applications may include one or more display arrangements known as media guidance interfaces. As used herein, the term "media guidance interface" refers to a display arrangement or a page in the guidance application that is generated for display to a user, so that the user may interact with the information and selectable options thereon. Exemplary media guidance interfaces are discussed in further detail below in relation to FIGS. 1-3.

The media guidance application and/or any instructions for performing any of the embodiments discussed herein may be encoded on computer-readable media or machine-readable media. Computer- or machine-readable media include any media capable of storing data. The computer- or machine-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.)), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
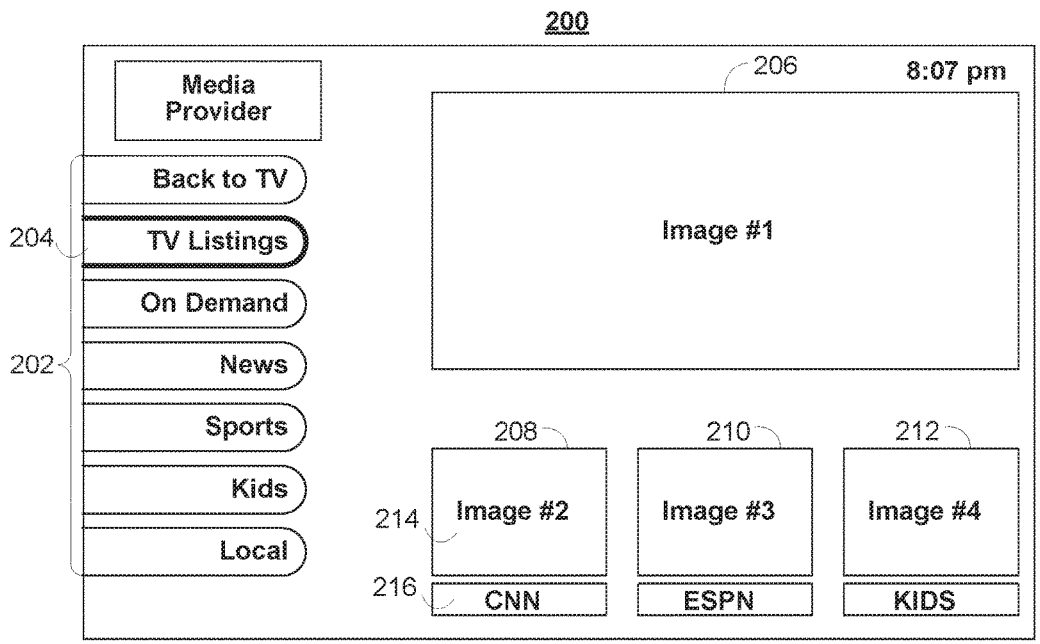
FIG. 2 shows another illustrative media guidance interface that may dynamically include or exclude a video, in accordance with some embodiments of the disclosure.

FIGS. 1-2 show illustrative media guidance interface on a display screen that may dynamically include or exclude a video. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option (also known as an identifier) provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a media guidance interface with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 208, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

Figure 3:
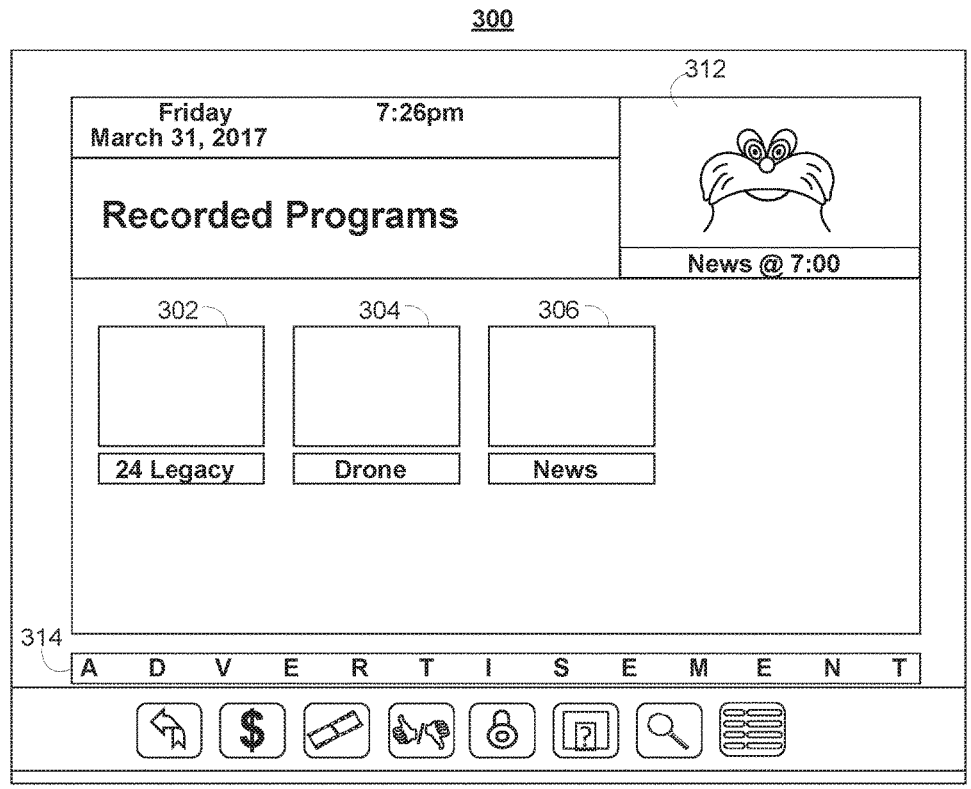
FIG. 3 shows yet another illustrative media guidance interface that may dynamically include or exclude a video, in accordance with some embodiments of the disclosure.

The listings in display 200 are of different sizes (i.e., listing 206 is larger than listings 208, 210, and 212), but if desired, all the listings may be the same size (as shown in FIG. 3 below). Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

FIG. 3 shows yet another illustrative media guidance interface on a display screen that may dynamically include or exclude a video. Display 300 shows a media guidance interface for program recordings. In some embodiments, a user may navigate to display 300 by selecting recorded content listing 116 from display 100.

Display 300 includes a number of selectable options 302, 304, and 306, as well as video region 312. Some of the selectable options may correspond to completed recordings of programs or other media assets, while some other selectable options may correspond to a program or media asset that is currently being recorded. For example, selectable option 306 corresponds to the "News" program, which started at 7:00 pm and is still on-going. Video region 312 may be illustratively shown as a PiG window in display 300. However, other possible display arrangements are envisioned, including a full-screen display of the content shown in video region 312 along with the selectable options superimposed thereon, a full-screen display of the content shown in video region 312 as a faded background to the guidance data, or a split-screen display arrangement with the video region 312 having an adjustable boundary within the media guidance interface. In some embodiments, video region 312 may display the "News" program because it is currently being recorded. In some other embodiments, video region 312 may display the default program, or the last-viewed program by the user, which in this case might happen to be the "News" program in coincidence.

As discussed above, one key drawback of traditional media guidance systems is that content is usually displayed in a PiG window, such as video region 312, by system default. A user usually cannot choose to display or hide the video region 312. This creates situations in which the user may accidentally run into spoilers when she turns on the television and immediately becomes exposed to video currently being recorded (which she intended to record now and enjoy at a later time).

In some embodiments, the media guidance application may generate displays 100, 200, or 300 to the user as soon as the user turns the user equipment on. The media guidance application may refrain from showing any video in video regions 122 or 312 when the user equipment is first turned on, because showing a random or last-viewed channel by default will simply create distraction for the user as she browses the listings on grid 102 or chooses a recording on display 300. In some embodiments, however, the media guidance application may determine, from the user's viewing history, that the user always watches a particular media asset at the current time. In such instances, the media guidance application may display the particular media asset by default in video regions 122 or 312, when the user first powers on the user equipment.

In some embodiments, if the user has been watching a media asset for a certain period of time and then presses the GUIDE button to go to a media guidance interface, such as displays 100, 200, or 300, the media guidance application may continue to display the media asset in video regions 122 and 312 on media guidance interfaces 100 and 300, respectively. For example, if the user actively selected option 302 for an episode of "24 Legacy" and has been watching the recording for half an hour before pressing the GUIDE button to return to media guidance interface 300, the media guidance application may determine that the user has indicated interest in viewing the episode, and may continue showing the episode of the recording on video region 312. In some embodiments, however, if the media guidance application determines that the user is at the end of a media asset, it may exclude the media asset from appearing in the media guidance interface when the user command to return to the media guidance interface is received. For example, the user may be viewing the ending credits of the particular episode of "24 Legacy" when the media guidance application receives her command to return to media guidance interface 300. In this situation, the media guidance application may exclude the ending credits from being displayed in video region 312 in order to minimize noise and distraction to the user. Alternatively, the media guidance application may continue to show the video of the ending credits in video region 312, but mute the audio output.

In some embodiments, the media guidance application may browse the channels and media assets in media guidance interfaces, such as displays 100, 200, and 300, and generate the corresponding program or media asset for display in video region 122 or 312 as the channel or media asset is highlighted during the browsing. For example, as the user navigates highlight region 110 over different programs in grid 102, video region 122 may display each program when it is being highlighted. As another example, when the user highlights or points a cursor towards recordings 302, 304, or 306 successively, video region 312 may display a recording summary or a preview of the respective recordings. In this manner, the media guidance application allows the user to preview the media assets before deciding which one to watch.

In some embodiments, the media guidance application may be configured by the user to automatically select a media asset to be shown in video regions 122 or 312 based on the user's historical viewing behavior, regardless of her current selections. For example, if a user always watches a show on NBC at 11:00 am, followed by another show on CBS at noon, the media guidance application may automatically display the NBC show at 11:00 am while the user interacts with the media guidance interface, and then switch to the CBS show at noon.

In some embodiments, the media guidance application may display advertisements in video region 122 or 312 when no media asset is selected. The advertisements may be displayed as a still image, a selectable thumbnail art, or a promotional video. In addition, the media guidance application may also display further advertisements in dedicated advertisement regions 124 or 314.

Figure 4:
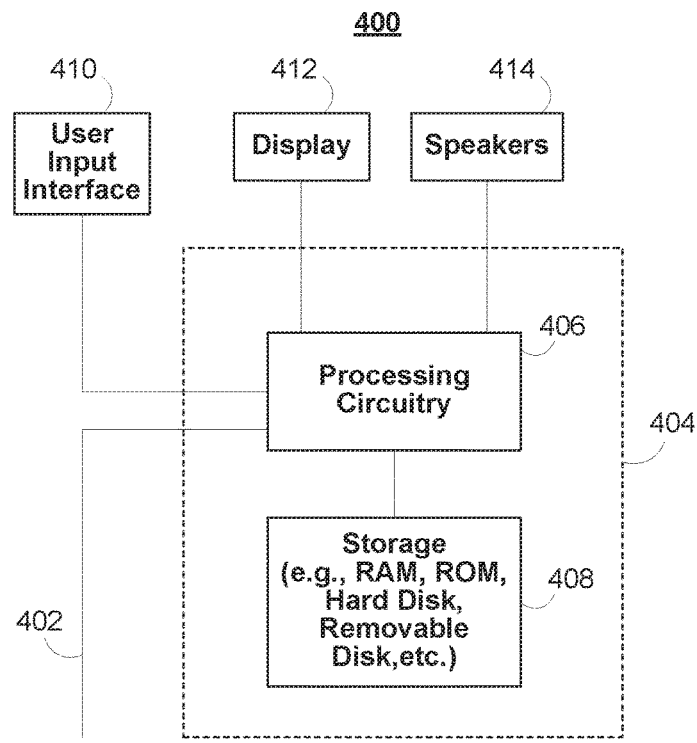
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
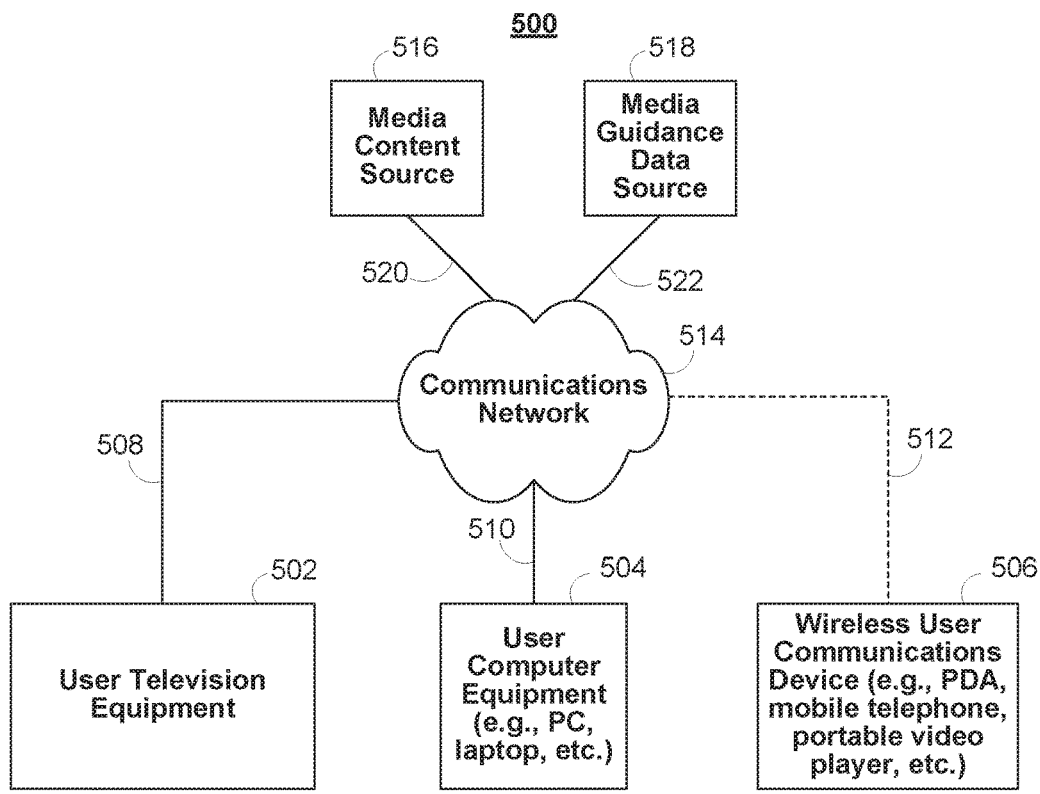
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Media content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Media content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
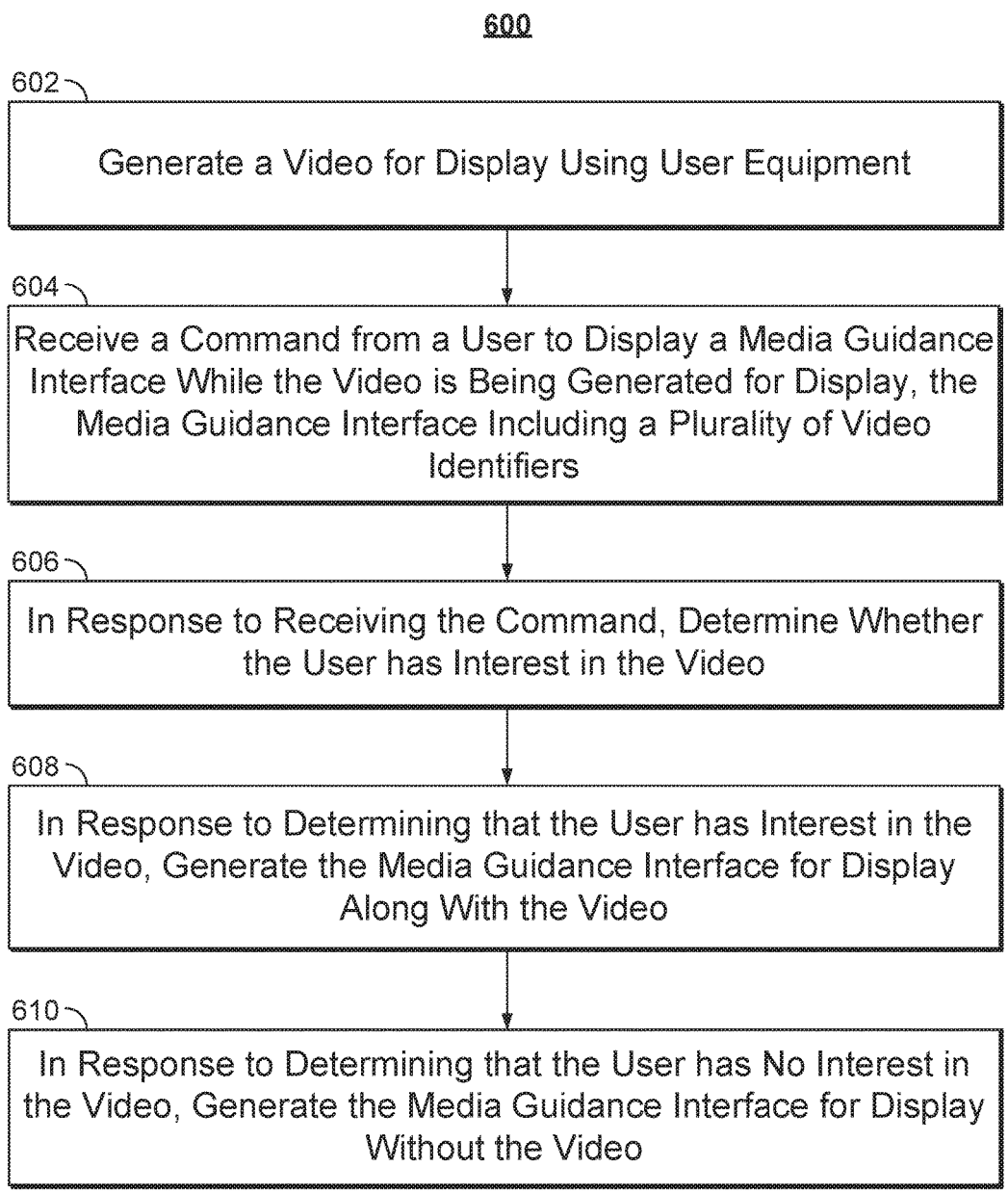
FIG. 6 depicts an illustrative flow diagram for dynamically including or excluding a video from a media guidance interface based on indications of user interest, in accordance with some embodiments of the disclosure.

FIG. 6 depicts an illustrative flow diagram for dynamically including or excluding a video from a media guidance interface based on indications of user interest, in accordance with some embodiments of the disclosure. Process 600 may be executed by control circuitry 404 (e.g., in a manner instructed to control circuitry 404 by the media guidance application). Control circuitry 404 may be part of user equipment (e.g., user television equipment 502, user computer equipment 504, and/or wireless communications device 506), or of a remote server separated from the user equipment by way of communications network 514.

Process 600 begins at 602, where control circuitry 404 generates a video for display using user equipment. In some embodiments, the video is generated by control circuitry 404 from user equipment 300 to be displayed on display 412. At 604, control circuitry 404 receives a command from a user to display a media guidance interface while the video is being generated for display. In some embodiments, the command is received by control circuitry 404 from user input interface 410. For example, the command may be generated when a user presses the GUIDE button on a remote control and is received by control circuitry 404 within user television equipment 502. The media guidance interface may be generated for display on the same display on which the video is generated for display, i.e., display 412, and includes a plurality of video identifiers (e.g., as shown in exemplary media guidance interfaces in displays 100, 200, and 300).

Process 600 continues to 606, where control circuitry 404 determines whether the user has interest in the video in response to receiving the command. As discussed above, the determination may be based on whether the user has explicitly or implicitly indicated interest in the video.

At 608, control circuitry 404 generates the media guidance interface for display along with the video in response to determining that the user has interest in the video. The video may, in some embodiments, be displayed within the media guidance interface in video regions 122 or 312, or be displayed as a faded background behind the media guidance interface. In some embodiments, the video may be displayed as a slideshow or preview in video regions 122 or 312. At 610, control circuitry 404 generates the media guidance interface for display without the video in response to determining that the user has no interest in the video. In some embodiments, the media guidance interface, such as displays 100 and 300, may be generated for display with video regions 122 and 312 blank. In some other embodiments, the media guidance interface may display various advertisements in video regions 122 or 312. The slideshow, preview, and various advertisements may be temporarily stored in storage 408, and retrieved by control circuitry 404 under the instruction of the media guidance application to be included in the display, or excluded from the display of the media guidance interface on display 412.

Figure 7:
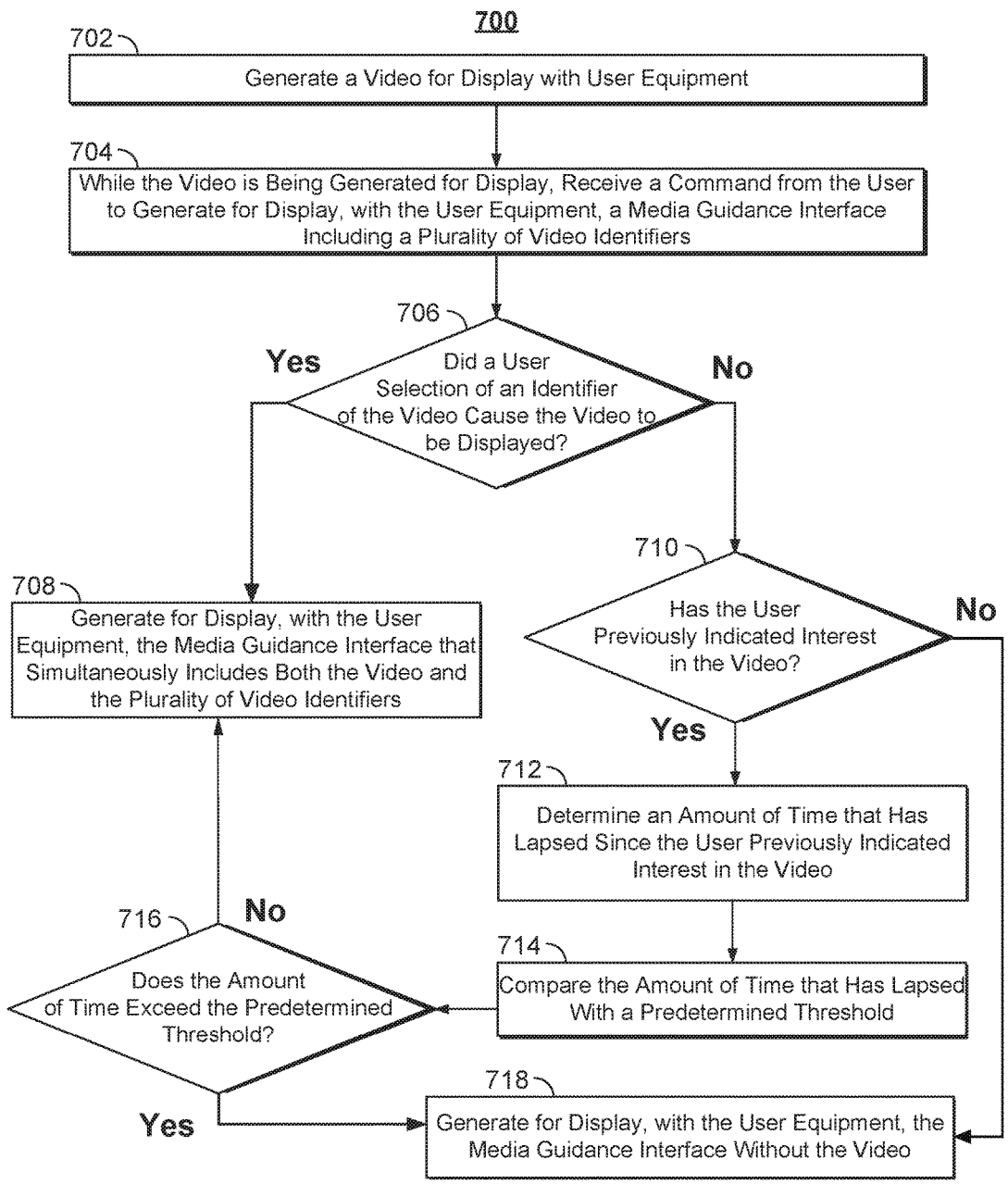
FIG. 7 depicts an illustrative flow diagram for determining indications of user interest and applying said indications of user interest to include or exclude a video from a media guidance interface, in accordance with some embodiments of the disclosure.

FIG. 7 depicts another illustrative flowchart for determining indications of user interest and applying said indications of user interest to include or exclude a video from a media guidance interface, in accordance with some embodiments of the disclosure. Process 700 may be executed by control circuitry 404 (e.g., in a manner instructed to control circuitry 404 by the media guidance application). Control circuitry 404 may be part of user equipment (e.g., user television equipment 502, user computer equipment 504, and/or wireless communications device 506), or of a remote server separated from the user equipment by way of communications network 514.

Process 700 begins at 702, wherein control circuitry 404 generates a video for display using user equipment. For example, the media guidance application running on control circuitry 404 may generate a television program for display on a display 412 of user television equipment 502. The video may be generated for display by way of an explicit user selection to play the video, as a result of the user equipment being powered on, or by any other triggering events.

At 704, control circuitry 404 may receive a command from a user to display a media guidance interface while the video is being generated for display. The media guidance interface may include a plurality of video identifiers. For example, control circuitry 404 may receive a command from a user using input interface 310 (e.g., by pressing the GUIDE button) to request media guidance interface 100 to be generated while the television program is being generated for display on user television equipment 502. The media guidance interface 100, in this example, includes a number of television program listings, each identifying a television channel or program. In another example, control circuitry 404 receives a command to generate media guidance interface 300, where a number of selectable options 302, 304, and 306 are listed, each identifying a past or current recording.

The command to display the media guidance interface may cause the media guidance interface to be generated either with or without the video currently being played by the user equipment. A variety of factors may be taken into account by control circuitry 404 to determine which version is eventually displayed. The following broadly discusses a few exemplary considerations, but they are by no means exhaustive. As understood by a skilled person in the media guidance art, any considerations taken to intelligently decide which version of the media guidance interface to display, including any combination of considerations thereof, are within the meaning of the present disclosure.

As discussed above, in some embodiments, the video may initially be generated for display as a result of the user equipment being powered on. Control circuitry 404 may determine that the user equipment was powered on within less than a threshold time period, and as a result, generate the media guidance interface for display without the video. For example, control circuitry 404 may determine that user television equipment 502 was powered on not too long ago—within a threshold time period—such that no video shall be included within the media guidance interface if the user issued a command to display the media guidance interface. The practical rationale behind this consideration is that, a user who quickly presses the GUIDE button to display the media guidance interface, upon turning on the user equipment, typically has little or no interest in what was being played on the television at the time (as it was probably being played by default). The user's level of interest in the default program is likely very low if the user presses the GUIDE button soon after turning on the set-top box. Accordingly, control circuitry 404 will not display the default program to avoid distracting the user. On the other hand, if the user, upon turning on the set-top box, has watched the default program for a period of time longer than the threshold time period, control circuitry 404 may determine that the user has demonstrated sufficient interest in the program, and may continue to include the program in the media guidance interface, so that the program is displayed simultaneously with the program listings At 706, control circuitry 404 may determine whether the video was caused to be displayed based on a user selection of an identifier of the video. For example, control circuitry 404 may determine that the television program being displayed on user television equipment 502 was caused to be displayed by the user's explicit selection of program listing 108 corresponding to the television program. Such an explicit selection of a video identifier, such as program listing 108, shows that the user has interest in the video "The Simpsons."

If control circuitry 404 determines that the video was caused to be displayed based on the user selection of the identifier, process 700 continues to 708, where control circuitry 404 generates for display the media guidance interface that simultaneously includes both the video and the plurality of video identifiers. As discussed above in relation to FIGS. 1-3, the video may be generated for display simultaneously with the plurality of video identifiers on the media guidance interface in a PiG window, as a video overlay, as a faded background, in an adjustable split window, or in any other suitable display arrangements. For example, control circuitry 404 of user television equipment 502 may, upon determining that the user explicitly tuned to FOX channel to view "The Simpsons" prior to pressing the GUIDE button, generate media guidance interface 100 including both "The Simpsons" (in video region 122) and a list of other program listings in grid 102. As another example, control circuitry 404 may determine that the user explicitly selected the "News" for viewing, despite the fact that it is currently being recorded. Therefore, when control circuitry 404 receives the user command to generate media guidance interface 300 for display, it includes the "News" in a PiG window at video region 312 along with other video identifiers, such as selectable options 302 and 304.

If, however, control circuitry 404 determines at 706 that the video was not caused to be displayed based on the user selection of the identifier, process 700 continues to 710, where control circuitry 404 determines whether the user has previously indicated interest in the video. For example, control circuitry 404 may determine that the user did not explicitly cause "The Simpsons" to be displayed by tuning to the FOX channel. In response, control circuitry 404 determines whether the user has previously indicated any interest in "The Simpsons" while it is being played.

In some embodiments, when control circuitry 404 determines that the video is generated for display by default when the user equipment is powered on, rather than by an explicit user selection of a video identifier, it may generate the media guidance interface for display without the video regardless of whether the user previously indicated interest in the video. For example, control circuitry 404 may generate "The Simpsons" for display on display 412, because the user had previously scheduled the program to be recorded at the present time. As such, it was not explicitly caused to be displayed by the user by an explicit tuning to the FOX channel. In this example, control circuitry 404 may simply generate media guidance interface 100 without showing "The Simpsons" in video region 122. In this manner, control circuitry 404, as a safety measure, avoids showing the user any spoilers in the program that is currently being recorded even if the user had previously indicated interest in it (e.g., by adjusting the volume prior to pressing the GUIDE button). If, for example, the user indeed wishes to continue viewing "The Simpsons" in the media guidance interface while it is being recorded, the user may indicate this desire to control circuitry 404, such as by pressing a dedicated button to toggle "on" video region 122. However, by default, control circuitry 404 may exclude any video that is currently being recorded, at least when it was previously scheduled to be recorded at the present time.

If, at 710, control circuitry 404 determines that the user has previously indicated interest in the video, process 700 continues to 712, where control circuitry 404 determines an amount of time that has lapsed since the user previously indicated interest in the video. In some embodiments, control circuitry 404 may determine the amount of time that has lapsed since the user previously indicated interest by identifying a point in time when the user most recently adjusted volume or brightness of the video, and calculating the amount of time based on a difference between the point in time and a current time. For example, the media guidance application may identify a point in time when the user adjusted the volume or screen brightness for "The Simpsons" most recently. As stated above, the user's concerted interactions with the television program, such as adjusting the volume or the screen brightness, are presumably implicit indications that the user is interested in the program. Other forms of implicit indications, such as when the user engages in discussions about the program (as captured by an audio input device and analyzed by control circuitry 404), could also be similarly time-stamped. Thereafter, control circuitry 404 may calculate the amount of time lapsed as the difference between the point in time (when the user most recently indicated her interest in the program) and the current time.

At 714, control circuitry 404 may compare the amount of time that has lapsed with a predetermined threshold. The threshold, in some embodiments, may be set by the user in advance. A higher threshold indicates that the user would like the system to take into account her indications of interest from further back in time when deciding whether she is still interested in the video. For example, a user may set the threshold to be 5 minutes. This means that any user indications of interest from more than 5 minutes ago are no longer relevant for control circuitry 404 to determine whether the user is interested in the program, "The Simpsons." To use an extreme case as another example, the user may set the threshold to be infinity. This means any user indication of interest in the program in the past, such as the user's proclamation of "I love The Simpsons" from two years ago, would still be relevant to the current decision. In some embodiments, the threshold may also be automatically set by the user equipment, such as user television equipment 502, based on the user's historical viewing and other profile data.

At 716, control circuitry 404 may determine whether the amount of time exceeds the predetermined threshold. For example, control circuitry 404 may determine that the user's last indication of interest from 2 minutes ago exceeds the "30 second" predetermined threshold. In other words, the user's indication of interest in the television program happened too long ago and, therefore, is no longer representative of the user's current level of interest. As another example, control circuitry 404 may determine that the user's indication of interest from 2 days ago does not exceed the threshold of "infinity."

If control circuitry 404 determines that the amount of time exceeds the predetermined threshold, process 700 continues to 718, wherein control circuitry 404 generates for display the media guidance interface without the video. Similarly, if control circuitry 404 at 710 determines that the user has not previously indicated interest in the video, control circuitry 404 would also generate for display the media guidance interface without the video, at 718. For example, control circuitry 404 in user television equipment 502 may determine that the user has either previously indicated interest in the video too long ago, or has not previously indicated interest in the video at all while "The Simpsons" was being played. This may occur, for example, if the program happens to start playing, by default, when user television equipment 502 was first powered on. It might also occur if the user merely showed some interest in the program but has since become distracted from it. In such situations, control circuitry 404 may generate media guidance interface 100 or 300 for display without the video regions 122 or 312 at all. Alternatively, as discussed above, control circuitry 404 may generate advertisements to be displayed in the video regions, or generate other media assets which the user typically views at this time in the video regions.

If, however, control circuitry 404 determines that the amount of time does not exceed the predetermined threshold, process 700 proceeds to 708, where control circuitry 404 generates the media guidance interface with the video and the plurality of video identifiers, simultaneously.

In some embodiments, control circuitry 404 may extract metadata associated with the video to determine whether the video includes spoilers when the command is received to generate for display the media guidance interface. The metadata associated with the video may be received from one or more remote servers, such as media content source 516 and media guidance data source 518. For example, control circuitry 404 may extract metadata from the information received by user television equipment 502, by way of communications network 514, from media guidance data source 518, to determine whether "The Simpsons" was showing spoilers when the user pressed the GUIDE button on user input device 410. In other words, control circuitry 404 determines whether "The Simpsons" happens to be playing any important plot point (or beat) when the user's command to display media guidance interface 100 was received.

If control circuitry 404 determines that the video includes spoilers when the command is received, control circuitry 404 may generate for display the media guidance interface without the video regardless of whether the user has previously indicated interest in the video. This is so that the user can avoid accidentally viewing the spoilers. For example, if control circuitry 404 determines that "The Simpsons" was playing a critical plot point when the GUIDE button is pressed, it may generate media guidance interface 100 without the television program in video region 122, because it is likely that the user gave the command to avoid seeing the spoiler. In this example, continuing to show the spoiler in the video regions would be contrary to what the user had wanted to accomplish by pressing the GUIDE button.

Predictions made by control circuitry 404 in relation to the user's inclination to view the video within a media guidance interface may be wrong, and therefore can be overridden by explicit user commands or subsequent determinations by control circuitry 404 that are contrary to the original predictions.

In some embodiments, control circuitry 404 may receive a further command from the user that indicates the user's interest in the video while the media guidance interface is generated for display without the video. For example, while media guidance interface 300 is generated for display with only the recording listings and without anything shown in video region 312, control circuitry 404 may receive a further command from the user to indicate that the user is actually interested in seeing the "News," despite the system's prior prediction to the contrary. In this example, control circuitry 404 may have originally excluded the "News" from video region 312 because it is currently being recorded. In other examples, control circuitry 404 may have excluded it because the user has not indicated any interest in the video. Regardless, this command from the user may override control circuitry 404's prior predictions, and cause control circuitry 404 to generate for display media guidance interface 300 that simultaneously includes both the "News" (in video region 312 or as an overlay) and the plurality of recording listings.

In some embodiments, control circuitry 404 may determine that the user has indicated a desire to stop the video while the media guidance interface is generated for display that simultaneously includes both the video and the plurality of video identifiers. For example, control circuitry 404, while generating media guidance interface 100 for display together with "The Simpsons" in video region 122, may receive a further command from the user to stop playing "The Simpsons" in the PiG window (i.e., video region 122). Alternatively, the user's desire to stop playing the program may be determined by monitoring the user's implicit interest in the television program. For instance, control circuitry 404 may determine, by way of a connected smart watch that the user is wearing, that the user has fallen asleep while the program is being displayed in video region 122 of the guidance interface. Hence, "The Simpsons" should be paused and saved for a later time.

Once control circuitry 404 determines that the user has indicated the desire to stop the video, control circuitry 404 may exclude the video from the media guidance interface. For example, control circuitry may simply display media guidance interface 100 without "The Simpsons" in video region 122 when the user has indicated the desire to stop playing the program (e.g., when the user has fallen asleep or issued an explicit instruction to stop, as discussed above).

Figure 8:
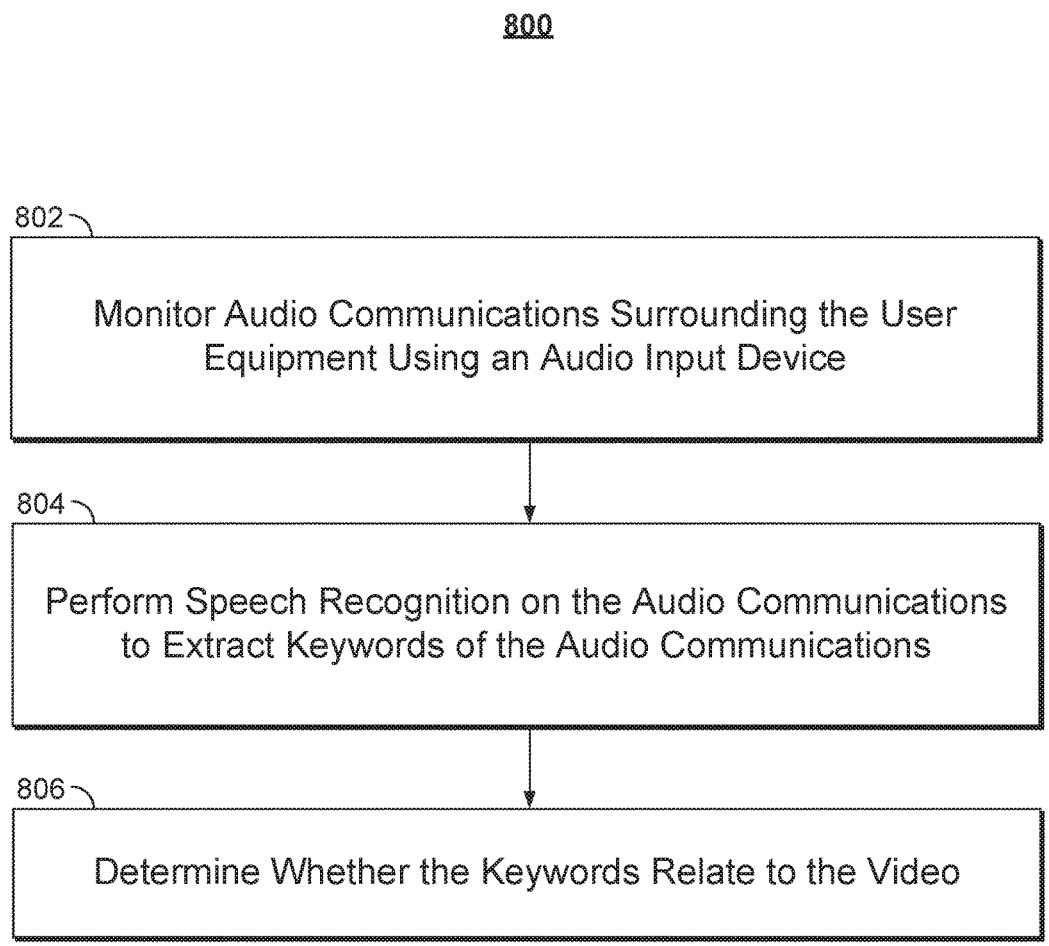
FIG. 8 depicts an illustrative flow diagram for using nearby audio communications to determine indications of user interest, in accordance with some embodiments of the disclosure.

FIG. 8 depicts an illustrative flow diagram for using nearby audio communications to determine indications of user interest, in accordance with some embodiments of the disclosure. As discussed above, in some embodiments, indications of interest may refer to implicit or implied indications, such as the user adjusting the volume or screen brightness for the video while viewing it. The rationale is that a user who is willing to adjust these viewing parameters is likely prepared to sit back and enjoy the video, hence, they indicate the user's interest in the video. In some embodiments, control circuitry 404 may utilize additional hardware to determine whether the user has previously indicated interest in the video. Process 800 starts at 802, wherein control circuitry 404 monitors audio communications surrounding the user equipment using an audio input device, such as a microphone. At 804, control circuitry 404 performs speech recognition on the audio communications to extract keywords of the audio communications. Once the keywords are extracted, at 806, control circuitry 404 determines whether the keywords relate to the video. This way, audio communications in the vicinity of the user equipment may be gathered to aid control circuitry 404 in determining whether the user is interested in the video enough to engage in a discussion of it. For example, control circuitry may instruct an audio input device near user television equipment 502 to monitor the audio communications in the vicinity. By performing speech recognition on the audio communications, control circuitry 404 may identify keywords in the audio communications and determine whether the keywords are related to "The Simpsons"—the program currently being displayed. There are a number of ways in which control circuitry 404 could identify the keywords and determine whether they are related to the program. For instance, control circuitry 404 running within user television equipment 502 may utilize a cloud-based speech recognition engine to analyze the audio communications captured by the audio input device. Control circuitry 404 may further download a list of keywords related to the television program "The Simpsons" from media guidance data source 518 and cross-reference the keywords extracted from the speech recognized against the keywords downloaded from the data source, to determine if they are related. If the keywords (hence, the communications in the vicinity) are related to "The Simpsons," control circuitry 404 may determine that the user has indeed indicated interest in the program. Conversely, if the keywords are not related to the program, control circuitry 404 may determine that the user is not engaged in the program and, therefore, demonstrates little interest to continue watching it.

Figure 9:
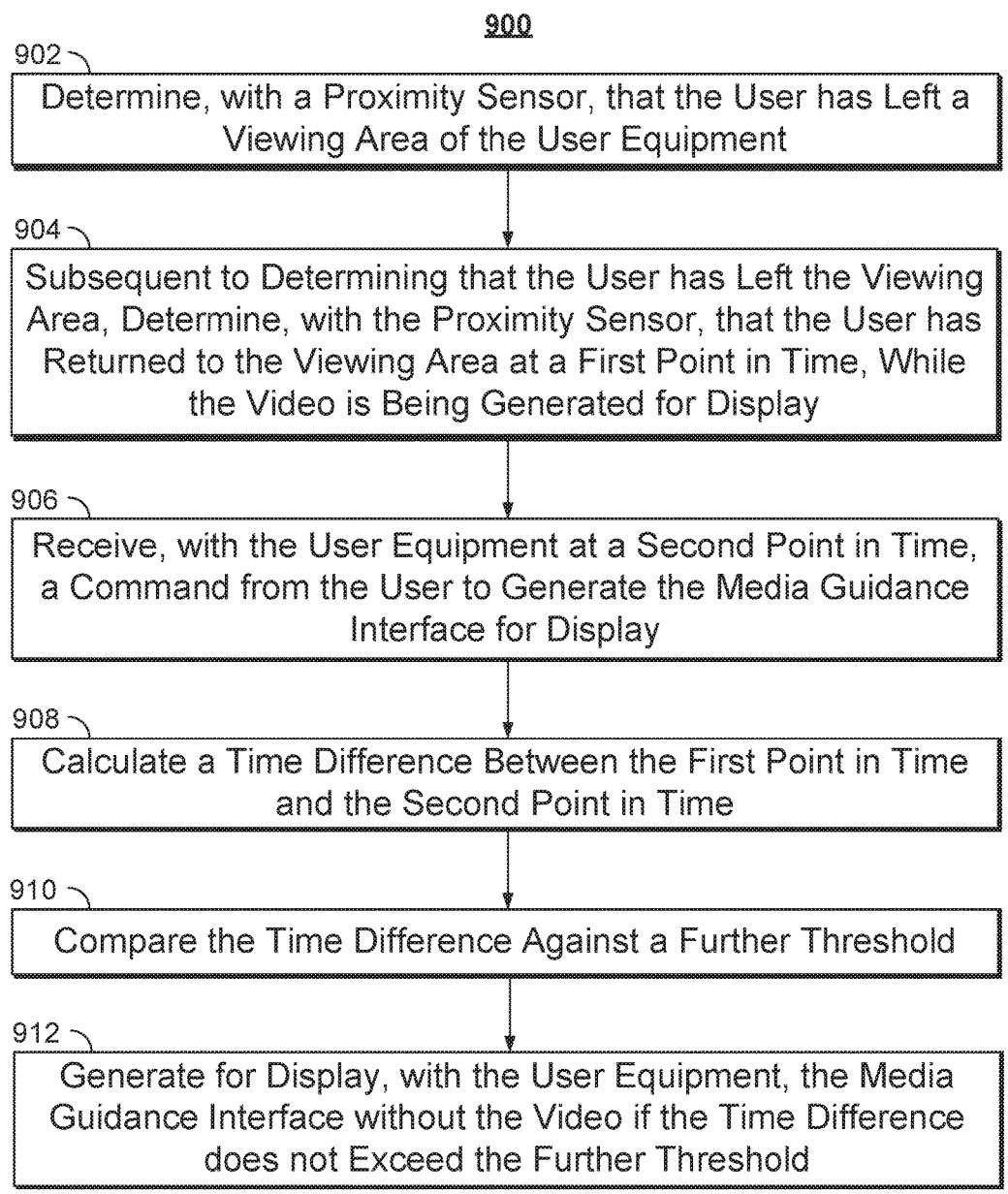
FIG. 9 depicts an illustrative flow diagram for using time-stamped user data to determine indications of user interest, in accordance with some embodiments of the disclosure.

FIG. 9 depicts an illustrative flow diagram for using time-stamped user data to determine indications of user interest, in accordance with some embodiments of the disclosure. While the above discussions pertain to processes 600-800 pertain to scenarios in which the user is physically in proximity to the user equipment, in some embodiments, control circuitry 404 may have to respond to situations in which the user is temporarily away. When the user is always physically near the user equipment, control circuitry 404 only needs to analyze the user's actions at or about the present time. However, when the user is away from the user equipment for a certain period of time, both the user's actions prior to her departure and after her return, including the times stamps associated with the departure and return, may be analyzed by control circuitry 404 to determine whether to include or exclude the video in the media guidance interface.

Process 900 starts at 902, where control circuitry 404 may determine, with a proximity sensor, that the user has left a viewing area of the user equipment prior to the video being generated for display. For example, control circuitry 404 may read from a proximity sensor that, prior to the television program beginning to play on user television equipment 502, the user has left the viewing area of display 412. At 904, control circuitry 404 may subsequently determine, with the proximity sensor, that the user has returned to the viewing area at a first point in time while the video is being generated for display. For example, control circuitry 404 may determine that the user has returned to the viewing area of display 412 at a first point in time, after the television program has begun to play. In other words, the television program was not playing when the user left the vicinity of display 412, but had begun playing prior to the user's return.

At 906, control circuitry 404 may receive, with the user equipment at a second point in time, the command from the user to generate the media guidance interface for display. For example, control circuitry 404 may determine that the user has pressed the GUIDE button on user input interface 410 at a second point in time, after the user has returned, in order for user television equipment 502 to generate media guidance interface 300.

At 908, control circuitry 404 may calculate a time difference between the first and second points in time. At 910, control circuitry 404 may compare the time difference against a further threshold. At 912, control circuitry 404 may then generate the media guidance interface for display without the video if the time difference does not exceed the further threshold. For example, if the time between the user's return and the user's pressing of the GUIDE button is short (i.e., it does not exceed the further threshold), control circuitry 404 may determine that the user has little interest in the recorded "News" being played, which had started while the user was away. This way, control circuitry 404 may determine whether to include or exclude a particular video from the media guidance interface even if the video had started while the user was away.

Accordingly, processes 600-900 depict illustrative flow diagrams for dynamically including or excluding a video from the media guidance interface, because the decision to include or exclude the video is made as the user performs certain actions, or as a sufficient amount of time has passed. Control circuitry 404 does not mechanically include or exclude the video by a binary user setting. Instead, control circuitry 404 interacts with a variety of sensors and input-output devices to make intelligent decisions suitable for a particular scenario created by user activity. As a result, the inclusion and exclusion of the video in the media guidance interface is made dynamically as the user equipment operates over time.

It should be noted that processes 600-900, or any step thereof could be performed on, or provided by, any of the devices shown in, or described with respect to, FIGS. 4-5. For example, either process 600 or process 700 may be executed by control circuitry 404 (FIG. 4) as instructed by media guidance application(s) implemented on user equipment 502, 504, 506 (FIG. 5). In addition, one or more steps of processes 600 and 700 may be incorporated into, or combined with, one or more steps of any other process or embodiment.

It is contemplated that the steps or descriptions of each of FIGS. 6-9 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 6-9.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining that a user has previously indicated interest in a video may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, the non-linear content, as described herein, may be stored in, and retrieved from, storage 408 of FIG. 4, or media guidance data source 518 of FIG. 5. Furthermore, processing circuitry, or a computer program, may update attributes of the media guidance application, such as the universal metadata, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for dynamically including or excluding a video from a media guidance interface based on indications of user interest, the method comprising:
    generating a video for display with user equipment;
    while the video is being generated for display, receiving a command from a user to generate for display, with the user equipment, a media guidance interface including a plurality of video identifiers;
    in response to receiving the command, determining whether the video was caused to be displayed based on a user selection of an identifier of the video;
    in response to determining that the video was caused to be displayed based on the user selection of the identifier, generating for display, with the user equipment, the media guidance interface that simultaneously includes both the video and the plurality of video identifiers; and
    in response to determining that the video was not caused to be displayed based on the user selection of the identifier:
        determining whether the user previously indicated interest in the video; and
        in response to determining that the user previously indicated interest in the video:
            determining an amount of time that has lapsed since the user previously indicated interest in the video;
            comparing the amount of time that has lapsed with a predetermined threshold;
            generating for display, with the user equipment, the media guidance interface without the video if the amount of time exceeds the predetermined threshold; and
            generating for display, with the user equipment, the media guidance interface that simultaneously includes both the video and the plurality of video identifiers if the amount of time does not exceed the predetermined threshold.

2. The method of claim 1, further comprising generating for display, with the user equipment, the media guidance interface without the video in response to determining that the user did not previously indicate interest in the video.

3. The method of claim 1, further comprising:
    extracting metadata associated with the video to determine whether the video includes spoilers when the command is received to generate for display the media guidance interface; and
    in response to determining that the video includes spoilers when the command is received, generating for display, with the user equipment, the media guidance interface without the video regardless of whether the user previously indicated interest in the video, in order to avoid spoilers from being presented to the user.

4. The method of claim 1, wherein generating the video for display with the user equipment further comprises powering on a display device of the user equipment while the video is being recorded, and the method further comprising, in response to determining that the video was not caused to be displayed based on the user selection of the identifier:
    generating for display the media guidance interface without the video regardless of whether the user previously indicated interest in the video.

5. The method of claim 1, wherein determining the amount of time that has lapsed since the user previously indicated interest further comprises:
    identifying a point in time when the user most recently adjusted volume or brightness of the video; and
    calculating the amount of time based on a difference between the point in time and a current time.

6. The method of claim 1, further comprising:
receiving a further command from the user that indicates the user's interest in the video while the media guidance interface is generated for display without the video; and
in response to receiving the further command, generating for display, with the user equipment, the media guidance interface that simultaneously includes both the video and the plurality of video identifiers.

7. The method of claim 1, further comprising:
while the media guidance interface is generated for display that simultaneously includes both the video and the plurality of video identifiers, determining whether the user indicates a desire to stop the video; and
in response to determining that the user indicated the desire to stop the video, excluding the video from the media guidance interface.

8. The method of claim 1, wherein determining whether the user previously indicated interest in the video further comprises:
monitoring audio communications surrounding the user equipment using an audio input device;
performing speech recognition on the audio communications to extract keywords of the audio communications; and
determining whether the keywords relate to the video.

9. The method of claim 1, further comprising generating for display, with the user equipment, the media guidance interface without the video in response to determining that the user equipment was powered on within less than a threshold time period.

10. The method of claim 1, further comprising:
determining, with a proximity sensor, that the user has left a viewing area of the user equipment prior to the video is generated for display;
subsequent to determining that the user has left the viewing area, determining, with the proximity sensor, that the user has returned to the viewing area at a first point in time while the video is being generated for display;
receiving, with the user equipment at a second point in time, the command from the user to generate the media guidance interface for display;
calculating a time difference between the first point in time and the second point in time;
comparing the time different against a further threshold; and
generating for display, with the user equipment, the media guidance interface without the video if the time difference does not exceed the further threshold.

11. A system for dynamically including or excluding a video from a media guidance interface based on indications of user interest, the system comprising:
user input circuitry configured to receive a command from a user to generate for display a media guidance interface including a plurality of video identifiers, while a video is being generated for display; and
control circuitry configured to:
generate the video for display;
in response to the user input circuitry receiving the command, determine whether the video was caused to be displayed based on a user selection of an identifier of the video;
in response to determining that the video was caused to be displayed based on the user selection of the identifier, generate for display the media guidance interface that simultaneously includes both the video and the plurality of video identifiers; and
in response to determining that the video was not caused to be displayed based on the user selection of the identifier:
determine whether the user previously indicated interest in the video; and
in response to determining that the user previously indicated interest in the video:
determine an amount of time that has lapsed since the user previously indicated interest in the video;
compare the amount of time that has lapsed with a predetermined threshold;
generate for display the media guidance interface without the video if the amount of time exceeds the predetermined threshold; and
generate for display the media guidance interface that simultaneously includes both the video and the plurality of video identifiers if the amount of time does not exceed the predetermined threshold.

12. The system of claim 11, wherein the control circuitry is further configured to generate for display the media guidance interface without the video in response to determining that the user did not previously indicate interest in the video.

13. The system of claim 11, wherein the control circuitry is further configured to:
extract metadata associated with the video to determine whether the video includes spoilers when the user input circuitry receives the command to generate for display the media guidance interface; and
in response to determining that the video includes spoilers when the command is received, generate for display the media guidance interface without the video regardless of whether the user previously indicated interest in the video, in order to avoid spoilers from being presented to the user.

14. The system of claim 11, wherein the control circuitry is further configured to:
generate the video for display by powering on a display device while the video is being recorded; and
in response to determining that the video was not caused to be displayed based on the user selection of the identifier, generate for display the media guidance interface without the video regardless of whether the user previously indicated interest in the video.

15. The system of claim 11, wherein the control circuitry is further configured to determine the amount of time that has lapsed since the user previously indicated interest by:
identifying a point in time when the user most recently adjusted volume or brightness of the video; and
calculating the amount of time based on a difference between the point in time and a current time.

16. The system of claim 11, wherein the user input circuitry is further configured to receive a further command from the user that indicates the user's interest in the video while the media guidance interface is generated for display without the video; and
the control circuitry is further configured to, in response to receiving the further command, generate for display the media guidance interface that simultaneously includes both the video and the plurality of video identifiers.

17. The system of claim 11, wherein the control circuitry is further configured to:

while the media guidance interface is generated for display that simultaneously includes both the video and the plurality of video identifiers, determine whether the user indicates a desire to stop the video; and in response to determining that the user indicated the desire to stop the video, exclude the video from the media guidance interface.

18. The system of claim 11, wherein the control circuitry is further configured to determine whether the user previously indicated interest in the video by:

monitoring audio communications surrounding the user equipment using an audio input device;

performing speech recognition on the audio communications to extract keywords of the audio communications; and determining whether the keywords relate to the video.

19. The system of claim 11, wherein the control circuitry is further configured to generate for display the media guidance interface without the video in response to determining that the user equipment was powered on within less than a threshold time period.

20. The system of claim 11, further comprising:

a proximity sensor configured to:

determine that the user has left a viewing area of the user equipment prior to the video is generated for display; and subsequent to determining that the user has left the viewing area, determine that the user has returned to the viewing area at a first point in time while the video is being generated for display;

wherein the user input circuitry is further configured to receive the command from the user to generate the media guidance interface for display at a second point in time; and wherein the control circuitry is further configured to:

calculate a time difference between the first point in time and the second point in time;

compare the time different against a further threshold; and generate for display the media guidance interface without the video if the time difference does not exceed the further threshold.

* * * * *